United States Patent [19]

Oberlerchner

[11] 3,963,197

[45] June 15, 1976

[54] CONTROL DEVICE FOR AVOIDING THE PITCHING UP OF MISSILES OR AIRCRAFT

[75] Inventor: Erhard Oberlerchner, Munich, Germany

[73] Assignee: Messerschmitt-Bolkow-Blohm GmbH, Munich, Germany

[22] Filed: Aug. 14, 1074

[21] Appl. No.: 497,504

Related U.S. Application Data

[63] Continuation-in-part of Ser. No. 315,635, Dec. 15, 1972, abandoned.

[30] Foreign Application Priority Data

Dec. 16, 1971 Germany............................. 2162349

[52] U.S. Cl............................... 244/181; 340/27 SS
[51] Int. Cl.$^2$......................................... B64C 13/50
[58] Field of Search.................. 244/76 R, 77 D, 82; 318/584; 340/27 SS

[56] References Cited

UNITED STATES PATENTS

| | | | |
|---|---|---|---|
| 2,584,298 | 2/1952 | Seay...................................... | 244/78 |
| 2,923,499 | 2/1960 | Dinard............................. | 244/76 R |
| 2,953,327 | 9/1960 | Clement et al. ................... | 244/77 D |
| 2,985,410 | 5/1961 | Richter et al. ..................... | 244/77 D |
| 3,015,458 | 1/1962 | Marx.................................... | 244/77 |
| 3,037,725 | 6/1962 | Treffeisen.......................... | 244/77 D |
| 3,072,369 | 1/1963 | Alderson........................... | 244/77 D |
| 3,172,079 | 3/1965 | Gunson et al...................... | 244/82 X |
| 3,241,792 | 3/1966 | Hattendorf......................... | 244/77 D |
| 3,260,108 | 7/1966 | Kaminskas..................... | 244/77 D X |
| 3,292,882 | 12/1966 | Walsh ................................ | 244/76 R |
| 3,518,621 | 6/1970 | Collett et al...................... | 340/27 SS |

*Primary Examiner*—Trygve M. Blix
*Assistant Examiner*—Barry L. Kelmachter
*Attorney, Agent, or Firm*—Woodhams, Blanchard and Flynn

[57] ABSTRACT

A controller for avoiding the pitching up of aircraft. A device is provided which, at a predetermined combination of the angle of attack and the aerodynamic rate of change of the angle of attack, supplied by a pitch rate gyro in connection with an electrical network, interrupts the pilot's command signal and transfers the control of the aircraft to the control device. The control device causes the aircraft to move through its change command by the pilot at primarily an optimum permissible limit for the angle of attack ($\alpha$) and an optimum permissible limit for the aerodynamic rate of change for the rate of attack ($\omega_7^*$). An optimum permissible limit which corresponds to the optimum permissible limit ($\alpha$ permissible) for the angle of attack ($\alpha$) is also provided so that all control operations commanded by the pilot which would exceed $\alpha$ permissible are stopped prematurely.

11 Claims, 6 Drawing Figures ered relatively high.
CONTROL DEVICE FOR AVOIDING THE PITCHING UP OF MISSILES OR AIRCRAFT This application is a continuation-in-part application of Ser. No. 315,635, filed Dec. 15, 1972, now abandoned.

FIELD OF THE INVENTION

The invention relates to a control device for avoiding the pitching up of missiles or aircrafts, in which a device is provided which at a predetermined combination of the angle of attack and the aerodynamic rate of change of the angle of attack stops the pitching up process commanded by the pilot and the control operation is transferred to a control mechanism of the missile or aircraft to optimize the performance within the design criteria. Certain types of aircraft are namely inclined to pitch up during a pull-up in the air fight or during attack near the ground, that is to assume nonpermissible high angles of attack, which often has catastrophic consequences. This is mainly the case in high-speed aircrafts, the elevator assembly of which is arranged relatively high.

BACKGROUND OF THE INVENTION

An appropriate mechanism of a controller for avoiding the pitching up of aircrafts is for example described and illustrated in U.S. Pat. No. 3,015,458. This known control device works in dependency of both the flight Mach number and the elevator angle permissible thereby. The latter means an indirect dependency from the stationarily permissible angle of attack.

A further appropriate mechanism has become known through U.S. Pat. No. 2,953,327. This controller prevents a quasi-stationary stalling of the aircraft by limiting the load factor (n). The load factor (n), which corresponds to the permissible $C_L$ - lift value or the permissible $\alpha$ - value, is calculated by means of an analog circuit and is compared with the respective value from an acceleration transmitter. This arrangement amounts to an indirect determining of the permissible angle of attack by measuring the dynamic pressure and calculating the weight.

Supplementary to the known state of the art, U.S. Pat. Nos. 2,584,298, 2,923,499, 3,172,079, 3,292,882 and 3,518,621 are pointed out, in which substantially only the required underpressure at the suction side of the airfoil section or the permissible flying speed or the permissible angle of attack is used as criteria for preventing and/or indicating the upward angle of attack. These publications do not contain — similarly to the aforementioned ones — a disclosure of an aiming signal composed of the aerodynamic rate of change of the angle of attack, which aiming signal is required for high-speed aircrafts.

Other known, appropriate controllers stop the pitching up function too quickly primarily in dependency on the aerodynamic rate of change of the angle of attack. This method has — as this has been proven, however, by the practice of appropriate high-speed aircrafts — the disadvantage that the permissible maximum value of the angle of attack is only rarely exhausted or can only rarely be exhausted.

According to flight technology, it can be stated generally that the critical limit for the angle of attack at which the tendency for pitching up to occur may not be exceeded. In order to assure a pull out of the respective aircraft before it reaches this condition, an aiming signal must determine (not lastly because of the existing dynamic conditions, for example, the inertia of the aircraft) whether, and if so, how fast the aircraft approaches the dangerous condition or critical limit for the angle of attack. It therefore was obvious in existing cases and so far partly also common to feed the angle of attack and its time change as input signals into the respective controller. For this, in the practice for example through a so-called wind vane, the signal of the instantaneous angle of attack and the function of time of the rate of change of the angle of attack, which function of time is transformed by means of electric networks onto the time change of the angle of attack, are fed into the computer of the controller as a release signal. The latter means that the rate of change of the angle of attack which is taken off of the pitch rate gyro is changed through suitable filters in such a manner that after the filtering, a function of time exists which can approximately be compared with the time change of the angle of attack. A signal proportional to the angle of attack is added to same in a known manner and the sum obtained is compared with a reference value.

These, among others, also until now built pitch up controllers, are also in certain respects considerably contridictory to the function which they are actually intended to carry out. Namely they have the disadvantage that they, due to their primary dependency on the pitch signal, also often stop the pitching up process too early and therefore in many cases cause a ground contact which actually could have been avoided.

Therefore, the invention is based on the knowledge that pitching up controllers of missiles or aircrafts cannot operate at an optimum if they are oriented exclusively on the angle of attack or exclusively on the rate of change of the angle of attack. Even if, for both controlled conditions, limits are set, these limits are not very suitably adjusted to one another and an optimum control for preventing the pitching up of missiles cannot take place with the known equipment.

SUMMARY OF THE INVENTION

According to the invention, it is therefore suggested, for avoiding the known disadvantages, that the forces developed on the control surfaces are oriented primarily about an optimum permissible limit of the angle of attack and an aerodynamic rate of change of the angle of attack or the pitch signal. An optimum permissible limit which corresponds to the optimum permissible limit for the angle of attack is also provided so that only those control operations which would exceed the permissible angle of attack are stopped prematurely. The invention therewith offers the main advantage that — particularly during air flight — an optimum utilization of the flight performance of the respective aircraft is possible; namely because at medium and smaller control surface moving speeds and its steps, the controller does not yet become active compared with comparable devices of the known state of the art. However, at stick movements by the pilot which are too sharp and too strong, the aircraft is prevented from the pitching up in that the inventive response limits, in a suitable manner through an optimum reciprocal tuning to one another, correct the not permissible control operation. Since an aircraft, in the scope of the inventive control device, can therefore not pitch up, the pilot has the possibility to completely exhaust the maximum output of which the aircraft is capable without any hesitation.

The invention provides furthermore that the control surface moving speed of the respective missile or aircraft can be adjusted automatically or manually to the optimum permissible values. Through this measure, the safety of an aircraft particularly during ground fighting is increased because the control surface moving speed can be limited at an optimum just to the value which still results in flight reactions within the permissible limits for the rate of change of the angle of attack and the angle of attack. Through this, it is assured during all control operations that the controller will not become active. Each action of the controller and the correction of the control operation connected therewith means namely a loss in altitude. This again can, particularly during ground fighting through ground contact, have catastrophic consequences for man and machine. Through the inventive measure, the respective aircraft can, however, be pulled out at an optimum rate in relation to its flight performances.

Finally it is provided within the scope of the invention that the response limits of the controller, both for the angle of attack and also for the aerodynamic rate of change of the angle of attack, can be individually varied in order to be able to adjust the optimum corresponding conditions which are required for each mission.

BRIEF DESCRIPTION OF THE DRAWINGS

The invention is illustratively explained in the drawings, in which.

DETAILED DESCRIPTION

In all diagrams, the voltage of angle of attack $\alpha$ is plotted on the abscissa and the aerodynamic rate of change of the angle of attack $\omega_Y{}^=$, respectively, its voltage V is plotted on the ordinate.

Figure 1:
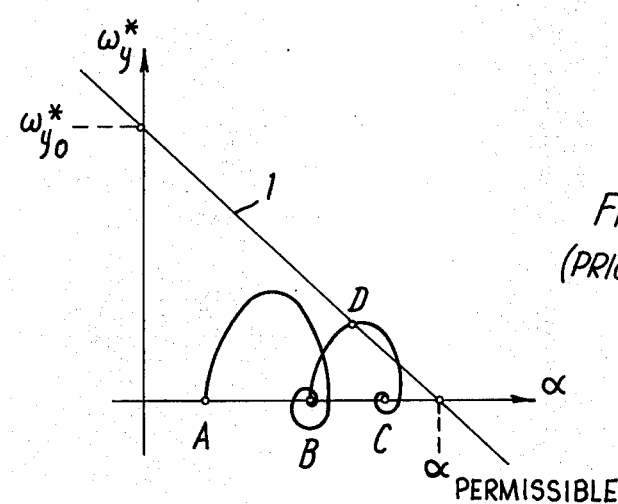
FIG. 1 is a diagram with the usual, known limits for the angle of attack and the aerodynamic rate of change of the angle of attack.

As can be taken from FIG. 1, the presently known response limit at which the control devices become inaccurate represents a straight line 1 which is defined in the given coordinate system by a certain value $\omega_{Y_0}{}^=$ and by a certain value $\alpha$ — in this case by $\alpha$ permissible. An aircraft moving within the response limit permits the control device according to the diagram, to adjust dynamically ($\dot{\eta} >> 0$ wherein $\eta$ is the control surface moving speed) in the lower angular change zone of the angle of attack A for the aircraft to the value B. As FIG. 1 furthermore clearly illustrates, the next step in the change of the angle of attack, respectively, its adequate surface moving from B to C, no change can be carried out to completion because the rate of change of the angle of attack limit for the aircraft, namely the response limit, is exceeded at D even though in the started maneuver the limit $\alpha$ permissible of the optimum permissible angle of attack for the aircraft was no where near being exceeded. This means that in this known control mechanism the controller is activated too early.

Figure 2:
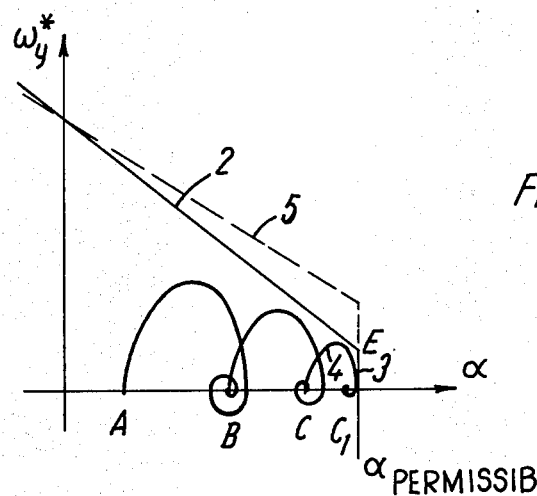
FIG. 2 is a diagram according to FIG. 1 with the inventive limits for the mentioned values.

To avoid this disadvantage, it is the purpose of the invention according to FIG. 2, to cause an adjustment of the permissible rate of change of the angle of attack limit 2 in such a manner with the limit for $\alpha$ permissible that the automatic pitching up control starts only when at an excessive angle of attack change the danger exists that one or both limits are to be exceeded.

The inventive limiting line, the exceeding of which activates the controller to avoid the pitch up process, is thus composed according to FIG. 2 of the straight line 2 and of a further straight line 3 which intersect at point E. The straight line 2 is the limiting line of the rate of change of the angle of attack and the straight line 3 is the limiting line of the optimum angle of attack $\alpha$. These two limiting lines do not necessarily need to be straight. During a change of the angle of attack from A to B, B to C and particularly from C to $C_1$, it can clearly be recognized that the curve of change 4 at most conforms to the two limiting lines 2 and 3. This means that the respective aircraft can swing at an optimum into a new angle of attack.

The dashed straight line 5 in FIG. 2 indicates that the response limit 2 of the aerodynamic rate of change of the angle of attack can be adjusted individually in the controller within the scope of the invention depending on the mission of the respective aircraft.

Figure 3:
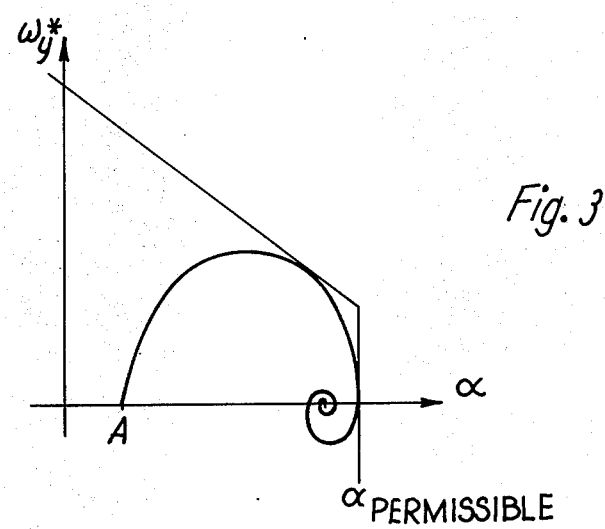
FIG. 3 is a diagram corresponding to FIG. 2 having a special limit value adjustment.

FIG. 3 finally illustrates a practical case of application according to which the control surface moving speed $\eta$ and its steps, is limited to optimum permissible values for $\omega_Y{}^=$ and $\alpha$. In this case during special control operations, particularly during ground fighting, any action of the controller is avoided.

Figure 4:
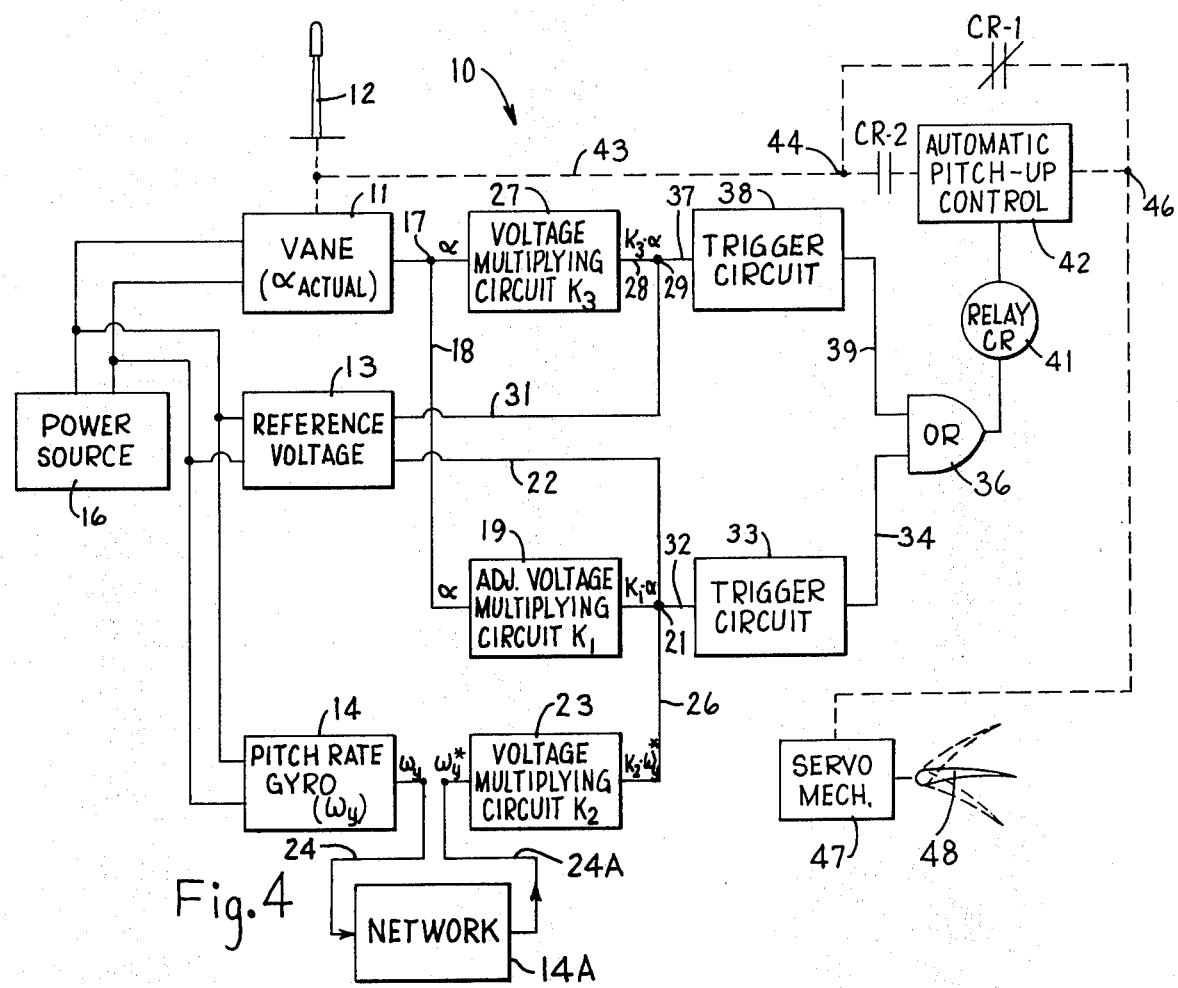
FIG. 4 is a schematic showing of a circuit for accomplishing the desired aircraft control.

The apparatus 10 for accomplishing the foregoing objectives is shown in FIG. 4. The apparatus 10 is composed of an attack angle responsive vane 11 which supplies a signal indicative of the actual angle of attack demanded by the pilot through the operation of the pilot's control stick 12. In addition, the apparatus 10 is composed of a source of reference voltage 13 and a pitch rate gyroscope 14. The pitch rate gyroscope 14 produces a signal indicative of the rate of change of the angle of pitch of the aircraft after a change in the angle of attack has been demanded by the pilot. The output from the pitch rate gyro 14 is directly proportional to the magnitude of the rate of change of the angle of pitch of the aircraft. The vane 11, reference voltage source 13 and the pitch rate gyro 14 are all supplied with electrical energy from the power source 16.

The output of the vane 11 producing an output signal $\alpha$ is supplied through a junction point 17 and the conductor 18 to an adjustable voltage multiplying circuit 19 which converts the input $\alpha$ to $K_1 \cdot \alpha$. The slope of the line 2 (FIG. 5) is controlled by the adjustable voltage multiplying circuit 19. The product of $K_1 \cdot \alpha$ is connected to a first summing junction 21. In addition, the reference voltage source 13 supplies a reference voltage through line 22 to the first summing junction 21.

The pitch rate gyro 14 supplies via a network 14a a voltage signal which is approximately proportional to the magnitude of the rate of change of the angle of attack of the missile or aircraft. This voltage signal $\omega_Y{}^=$ is fed to a voltage multiplying circuit 23 through a line 24a wherein the signal $\omega_Y{}^=$ is converted to the product of $K_2 \cdot \omega_Y{}^=$. The signal $K_2 \cdot \omega_Y{}^=$ is fed through line 26 to the first summing junction 21. In this particular embodiment, the voltage reference signal on the line 22 from the voltage reference source 13 is a positive signal whereas the products $K_1 \cdot \alpha$ and $K_2 \cdot \omega_Y{}^=$ are both negative signals.

The output signal $\alpha$ from the vane 11 is also fed from the junction point 17 to a voltage point 17 to a voltage multiplying circuit 27 which converts the signal $\alpha$ to $K_3 \cdot \alpha$. The signal $K_3 \cdot \alpha$ is fed through a line 28 to a second summing junction 29. The product $K_3 \cdot \alpha$ is negative in magnitude. The voltage reference source 13 supplies a reference voltage through the line 31 to the second summing junction 29 and the magnitude of the reference voltage on the line 31 is positive. The current branches 31 and 22 or the points 29 and 21, thus also 31 and 21, may not be electrically connected. The voltage through the point 21 operates the trigger 33 and the voltage through the point 29 operates the trigger 38.

The first summing junction 21 is connected through a line 32 and first trigger circuit 33 and line 34 to one input terminal of an OR gate 36. Similarly, the second summing junction 29 is connected through a line 37, second trigger circuit 38 and line 39 to another input terminal of the OR gate 36. The output of the OR gate 36 is connected through a control relay 41 to an automatic pitch up control circuit 42.

The signal produced by the pilot's command stick 12 is transmitted through not only the schematically illustrated connection to the vane 11 but also a schematically illustrated connection 43 to a junction point 44 and thence through a normally opened contact CR-2 of the control relay 41 to the input of the automatic pitch up control circuit 42. A normally closed contact CR-1 is connected in parallel with the series connected contact CR-2 and the automatic pitch up control 42 between the junction point 44 and a junction point 46. The output signal produced either by the pilot's command stick 12 (through the normally closed contact CR-1) or the automatic pitch up control 42 (when the contact CR-1 is open and the contact CR-2 is closed) is fed through the junction point 46 to a servo mechanism 47 to a movable control surface 48 on the aircraft or missile. In this particular instance, the control surface 48 is the elevator mechanism on the aircraft of missile.

Figure 6:
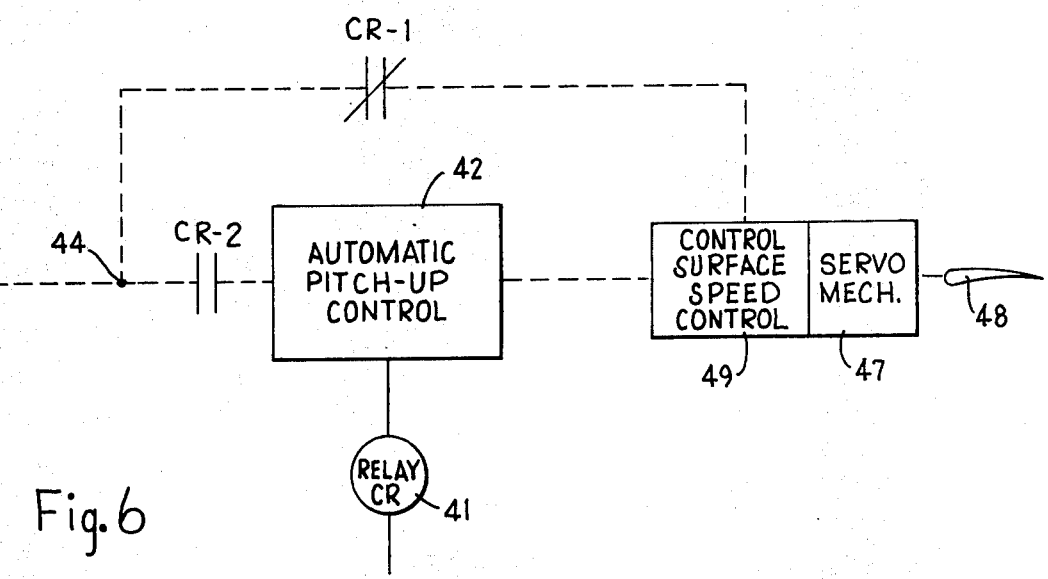
FIG. 6 is a fragmentary schematic illustration of a portion of FIG. 4 illustrating a modified embodiment.

An alternate embodiment is illustrated in FIG. 6. However, only a fragmentary portion of the circuit illustrated in FIG. 4 is shown in FIG. 6. The only difference between the circuit illustrated in FIG. 4 and the circuit illustrated in FIG. 6 is the provision of the control surface speed and step deflection control 49 which is connected at one input terminal to the junction point 44 through the normally closed contact CR-1. The other input to the control surface speed control 49 is connected to the output of the automatic pitch up control 42. The control surface speed control effectively controls the speed of the servo mechanism 47 and, consequently, controls the speed of movement of the control surface 48. As stated above, a control of the speed of movement and of step deflection of the control surface renders the safety of the aircraft, particularly during ground fighting, greater because the optimum limits defined above will not be exceeded.

Figure 5:
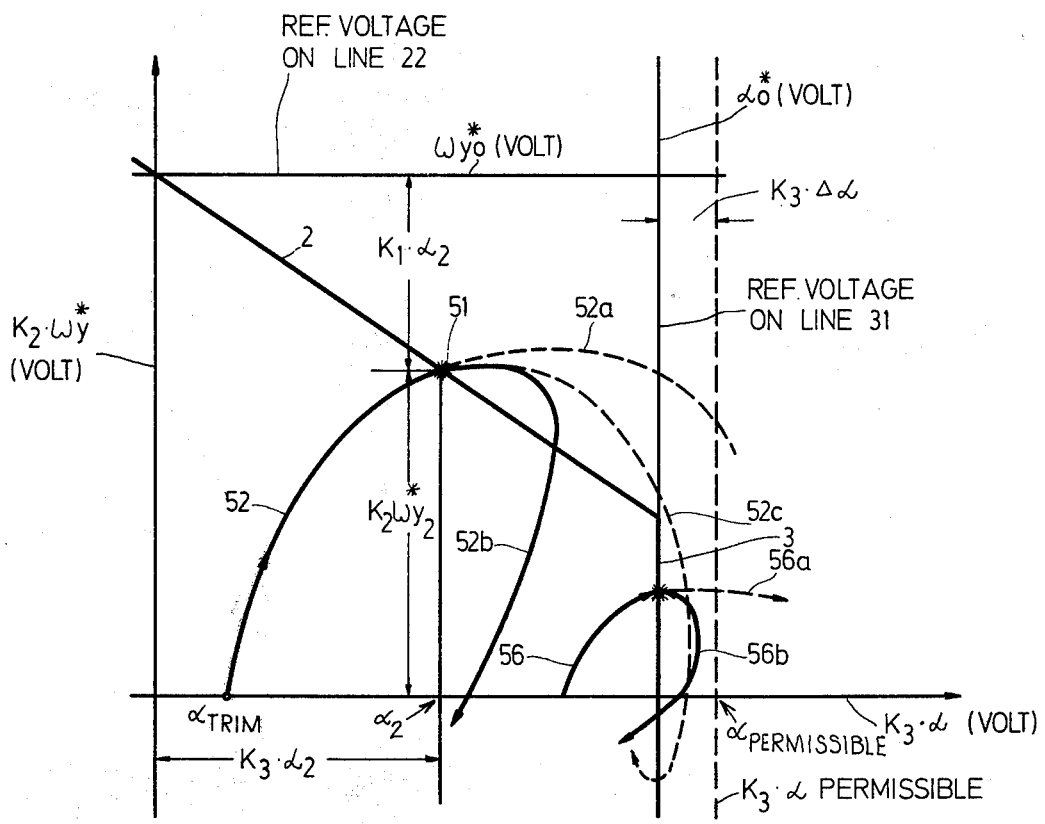
FIG. 5 is a diagram corresponding to FIG. 3.

Referring now to FIG. 5, FIG. 5 represents in slightly different detail the same type of control curve illustrated in FIGS. 2 and 3. If it is assumed, for example, that the aircraft or missile is trimmed with an $\alpha$ setting at $\alpha_{trim}$, and the pilot commands a new control surface setting generating a new $\alpha_2$ signal, the control surface 48 will move on command of the pilot through the connection provided by the line 43 and the normally closed contact CR-1 to the servo mechanism 47. The pitch rate gyro 14 via network 14a will immediately respond to the change in direction of travel of the aircraft as a result of a change in the position of the control surface 48 to produce a signal which is approximately proportional to the rate of change of the angle of attack of the missile or aircraft. As shown in FIG. 5, an $\alpha_2$ setting could produce a $K_2 \cdot \omega_{Y2}{}^=$ signal at position 51. Since the position 51 is at the limit defined by the slopping line 2, the first trigger circuit 33 would be activated to supply a signal to one of the input terminals to the OR gate 36 to energize the control relay 41. Energization of the control relay 41 will effect a closing of the contacts CR-2 and an opening of the contacts CR-1 so that all pilot commands will be transmitted through the line 43 to the automatic pitch up control circuit 42. As a result, the pilot's command, which would have generated a change curve 52a has, instead, generated a change curve 52b controlled by the automatic pitch up control circuit 42. In other words, the command signal by the pilot to the control surface 48 has been interrupted in point 51 by the circuit 10 and has, instead, been supplied to the automatic pitch up control circuit 42 which is capable of maneuvering the aircraft through a change curve 52b or 52c which is within the limit of $\alpha$ permissible. Applicant makes no claim toward invention in the circuitry of the automatic pitch up control circuit 42 because such a system for controlling an aircraft is already known from documentation entitled "APC Computer Technical Manual" dated Apr. 15, 1962 prepared by Minneapolis-Honeywell Co. in cooperation with Lockheed Aircraft Corporation.

Simultaneous with the foregoing initiation of a control movement by the pilot, the vane circuit 11 produces an $\alpha$ signal which is transmitted through the voltage multiplying circuit 27 to the second summing junction 29. Since the magnitude of the product $K_3 \cdot \alpha$ is less than the reference voltage on the line 31 (see FIG. 5), the trigger circuit 38 will not be triggered so that no output will be applied to a terminal of the OR gate 36. However, the product $K_2 \cdot \omega_{Y2}{}^=$ produced by the voltage multiplying circuit 23 results in the sum of the reference voltage on the line 22, $K_1 \cdot \alpha_2$ and $K_2 \cdot \omega_{Y2}{}^=$ to be equal to zero resulting in an output from the trigger circuit 33 to supply through the line 34 a signal to an input to the OR gate 36 and consequently an activation of the automatic pitch up control circuit 42. As a result, and instead of the aircraft being controlled through a control curve 52a (FIG. 5), the automatic pitch up control circuitry 42 will control the aircraft through a control curve 52b or 52c.

If, for example, the trim of the aircraft were at an $\alpha$ lower than $\alpha_o$ and the pilot demanded an $\alpha$ value greater than $\alpha$ permissible, the absolute value of the product of $K_3 \cdot \alpha$ would exceed the reference voltage of line 31 and the trigger circuit 38 would be activated to operate the automatic pitch up control 42. As a result the aircraft would be controlled by the automatic pitch up control circuit 42 within the limits defined by the lines 2 and 3 (FIG. 5) along, for example, resulting a control curve 56b instead of the control curve 56a.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for avoiding a pitching up of aircraft during flight, comprising the steps of:

detecting the instantaneous angle of attack and producing a first signal;

detecting the rate of change of said angle of attack in response to a change in control surface position initiated by a pilot for said aircraft and producing a second signal;

disconnecting direct command of the control surface movement by the pilot in response to said first and second signals in advance of reaching a permissible angle of attack for said aircraft so that said direct commands from said pilot will ineffective to control the aircraft beyond said permissible angle of attack; and thereafter modulating said direct commands from said pilot so that the continued performance of said aircraft will be optimized by approaching said permissible angle of attack but not exceeding same, said optimizing occurring only as long as said first and second signals, which indicate the demand of said pilot, indicate that said permissible angle of attack will be exceeded.

2. The method according to claim 1, including the step of adjusting the moving speed ($\eta$) of said control surface to optimum permissible values.

3. The method according to claim 1, including the step of varying response limits ($\alpha$ permissible, $\omega_{yo}{}^=$) for adjusting and selecting the optimum, corresponding conditions which are required for each command.

4. The method according to claim 2, wherein said control surface is an elevator mechanism.

5. In an apparatus for avoiding a pitching up of aircraft having a movable control surface thereon controlled by a pilot for said aircraft and control means for modulating direct commands from said pilot so that the performance of said aircraft will be optimized by approaching a permissible angle of attack but not exceeding same, the improvement comprising:

first means for detecting the instantaneous angle of attack and producing a first signal;

second means for detecting the rate of change of said angle of attack in response to a change in control surface position initiated by said pilot and producing a second signal;

trigger circuit means defining said permissible angle of attack and being responsive to said first and second signals for disconnecting a direct command over a control surface movement by said pilot for said aircraft in response to said first and second signals which indicate that said aircraft will travel in a manner to exceed said permissible angle of attack, said direct command over said control surface movement by said pilot being stopped in advance of reaching said permissible angle of attack, said control means being responsive to a stopping of said pilot's direct command over said control surface movement and effecting a modulating of said direct commands from said pilot so that the continued performance of said aircraft will be optimized by approaching said permissible angle of attack but not exceeding the permissible angle of attack, said optimizing occurring only as long as said first and second signals indicate that said permissible angle of attack will be exceeded.

6. An apparatus according to claim 5, wherein said control means controls the moving speed of said control surface to minimize the occurrence of said disconnection of said pilot's direct command over said control surface movement.

7. An apparatus according to claim 6, wherein said control surface is an elevator mechanism.

8. An apparatus according to claim 5, wherein said second means includes a pitch rate gyro.

9. An apparatus for avoiding a pitching up of aircraft having a movable control surface thereon controlled by a pilot for said aircraft, comprising:

first means for detecting the instantaneous angle of attack and producing a first signal;

second means for detecting the rate of change of said angle of attack in response to a change in control surface position and producing a second signal;

means defining a source of first and second reference voltage signals;

first voltage multiplying means responsive to said first signal to produce a third voltage signal proportional to said first signal;

adjustable second voltage multiplying means responsive to said first signal to produce an adjustable fourth voltage signal proportional to said first signal;

third voltage multiplying means responsive to said second signal to produce a fifth voltage signal proportional to said second signal, said third, fourth and fifth voltage signals being opposite in sign from said first and second reference voltages;

first trigger circuit means for producing a sixth signal in response to a sum of said first reference voltage and said third voltage signal which is beyond a first predefined threshhold value;

second trigger circuit means for producing a seventh signal in response to a sum of said second reference voltage and said fourth and fifth voltage signals which is beyond a second predefined threshold value; and switch means responsive to both of said sixth and seventh signals for disconnecting the direct command over a control surface movement by a pilot for said aircraft in response to one or both of said sixth and seventh signals, said direct command over said control surface movement by said pilot being disconnected in advance of said sum of said first reference voltage and said third voltage signal being beyond a third predefined threshold which is a permissible angle of attack limit for said aircraft.

10. An apparatus according to claim 9, wherein said adjustable second voltage multiplying means is varied to keep said sum of said first reference voltage and said third voltage signal within said third predefined threshold to thereby optimize the performance of said aircraft.

11. An apparatus according to claim 9, including control means responsive to a disconnection of said pilot's direct command over said control surface movement for modulating said direct commands from said pilot so that the continued performance of said aircraft will be optimized by approaching said permissible angle of attack but not exceeding same, said optimizing occurring only as long as at least one of said sixth and seventh signals indicate that said permissible angle of attack will be exceeded.

* * * * *